US009815017B2

(12) United States Patent
Wei et al.

(10) Patent No.: US 9,815,017 B2
(45) Date of Patent: Nov. 14, 2017

(54) METHOD FOR REMOVING $SO_x$ FROM GAS USING ETHYLENE GLYCOL COMPOSITE SOLUTION

(71) Applicants: BEIJING BOYUAN HENGSHENG HIGH-TECHNOLOGY CO., LTD, Beijing (CN); YONGFENG BOYUAN INDUSTRY CO. LTD., JIANGXI PROVINCE, Ji'an, Jiangxi (CN); PEKING UNIVERSITY, Beijing (CN)

(72) Inventors: Xionghui Wei, Beijing (CN); Meihua Zou, Beijing (CN); Jun Wang, Beijing (CN); Li Chen, Jiangxi (CN); Lifang Li, Jiangxi (CN); Yong Sun, Beijing (CN); Jiaxu Liu, Beijing (CN); Chun Hu, Beijing (CN); Xiangbin Li, Jiangxi (CN)

(73) Assignees: BEIJING BOYUAN HENGSHENG HIGH-TECHNOLOGY CO., LTD., Beijing (CN); YONGFENG BOYUAN INDUSTRY CO. LTD., JIANGXI PROVINCE, Ji'an, Jiangxi (CN); PEKING UNIVERSITY, Beijing (CN)

( * ) Notice: Subject to any disclaimer, the term of this patent is extended or adjusted under 35 U.S.C. 154(b) by 0 days.

(21) Appl. No.: 15/102,291

(22) PCT Filed: Dec. 3, 2014

(86) PCT No.: PCT/CN2014/092859
§ 371 (c)(1),
(2) Date: Jun. 7, 2016

(87) PCT Pub. No.: WO2015/085880
PCT Pub. Date: Jun. 18, 2015

(65) Prior Publication Data
US 2017/0021304 A1  Jan. 26, 2017

(30) Foreign Application Priority Data

Dec. 12, 2013 (CN) .......................... 2013 1 0682799

(51) Int. Cl.
*B01D 53/50* (2006.01)
*B01D 53/14* (2006.01)
*B01D 53/78* (2006.01)

(52) U.S. Cl.
CPC ..... *B01D 53/1493* (2013.01); *B01D 53/1425* (2013.01); *B01D 53/1481* (2013.01);
(Continued)

(58) Field of Classification Search
CPC .. B01D 53/1481; B01D 53/50; B01D 53/502; B01D 53/507; B01D 2251/80;
(Continued)

(56) References Cited

U.S. PATENT DOCUMENTS 3,928,548 A  12/1975  Deschamps et al.
4,368,178 A   1/1983  Diaz
(Continued)

FOREIGN PATENT DOCUMENTS

CN  1087110 A   5/1994
CN  1133817 A  10/1996
(Continued)

OTHER PUBLICATIONS

Canadian Patent Office, Office Action and Examination Search Report for CA 2,932,467 dated Jun. 23, 2017.
(Continued)

*Primary Examiner* — Timothy C Vanoy
(74) *Attorney, Agent, or Firm* — Novick, Kim & Lee, PLLC; Allen Xue

(57) ABSTRACT

An ethylene glycol composite solution is used for removing $SO_x$ from a gas. The ethylene glycol composite solution is
(Continued)

made by mixing ethylene glycol and/or polyethylene glycol with an organic acid and/or organic acid salt containing no nitrogen atom in a molecule. The ethylene glycol composite solution is brought into contact with the gas containing $SO_x$ to absorb the $SO_x$ in the gas. The ethylene glycol composite solution loaded with absorbed $SO_x$ is regenerated by heating, vacuuming, gas stripping, ultrasonic treatment, microwave treatment, or radiation treatment to release by-products of sulfur dioxide and sulfur trioxide, and the regenerated ethylene glycol composite solution is recycled for use.

9 Claims, 7 Drawing Sheets

(52) U.S. Cl.
CPC .......... B01D 53/507 (2013.01); B01D 53/78 (2013.01); *B01D 2251/70* (2013.01); *B01D 2252/2023* (2013.01); *B01D 2252/2026* (2013.01); *B01D 2252/602* (2013.01); *B01D 2257/302* (2013.01); *B01D 2258/0283* (2013.01); *B01D 2258/0291* (2013.01)

(58) Field of Classification Search
CPC ........ B01D 2252/205; B01D 2257/302; B01D 2258/0283
See application file for complete search history.

(56) References Cited

U.S. PATENT DOCUMENTS

| | | | |
|---|---|---|---|
| 5,077,023 | A | 12/1991 | Leutner et al. |
| 5,785,888 | A | 7/1998 | Tsai et al. |
| 2016/0310888 | A1* | 10/2016 | Wei .................... B01D 53/1481 |

FOREIGN PATENT DOCUMENTS

| | | |
|---|---|---|
| CN | 1227135 A | 9/1999 |
| CN | 1398659 A | 2/2003 |
| CN | 101053746 A | 10/2007 |
| CN | 101502741 A | 8/2009 |
| CN | 103249465 A | 8/2013 |
| CN | 103432890 A | 12/2013 |
| DE | 2333708 A1 | 1/1975 |
| FR | 2202715 A1 | 5/1974 |
| FR | 2532190 A1 | 3/1984 |
| JP | 47-011328 B | 4/1972 |
| JP | 4970867 A | 7/1974 |
| JP | 51-018270 A | 2/1976 |
| JP | 53-072007 A | 6/1978 |
| JP | S53109873 A | 9/1978 |
| JP | S5472762 A | 6/1979 |
| JP | 59-112824 A | 6/1984 |
| JP | 62-95118 A | 5/1987 |
| JP | H03293032 A | 12/1991 |
| JP | H0596158 A | 4/1993 |
| JP | 06-228573 A | 8/1994 |
| JP | H10137542 A | 5/1998 |
| JP | 2012517890 A | 8/2012 |
| JP | 2016533893 A | 11/2016 |
| JP | 2017500197 A | 1/2017 |
| RU | 2070423 C1 | 12/1996 |
| SU | 655410 A1 | 4/1979 |
| SU | 927282 A1 | 5/1982 |
| SU | 1611411 A1 | 12/1990 |
| WO | 198400952 A1 | 3/1984 |
| WO | 199007467 A1 | 7/1990 |
| WO | 2003011432 A1 | 2/2003 |

OTHER PUBLICATIONS

European Patent Office, Supplementary European Search Report for EP 14868984.7 dated Jun. 27, 2017.
Japanese Patent Office, Decision to Grant a Patent for JP 2016-539178 dated Jul. 11, 2017.
Wenbin Dai et al. "Solubilities of Gases in Rectisol Process", Computers and Applied Chemistry, vol. 11, No. 1, pp. 44-51, Feb. 1994.
Bin Ma, "Development of Amisol Process", Coal Chemical Industry, vol. 68, No. 3, 1994, pp. 35-42.
Xionghui Wei et al., "Desulfurization of Gases with a Buffering Solution of Basic Ironic Salts", Journal of Chemical Industry and Engineering (China), vol. 49, No. 1, Feb. 1998, pp. 48-58.
Zhiqiang He et al., "Absorption Properties and Spectroscopic Studies of Dilute Sulfur Dioxide in Aqueous Glyerol Solutions", Industrial & Engineering Chemistry Research, 2012, vol. 51, pp. 13882-13890.
B. L Wedzicha et al., "Vapour Pressure of SO2 above Solutions of Sulphur(IV) Oxospecies: the Effects of Chloride Ion and Glycerol", Food Chemistry, vol. 55, No. 4, pp. 337-341, 1996.
Zheng Yun et al., "Glycerine-water Solution Humidity-controlling Method and its Effects on SO2 Atmospheric Corrosion of Hot Galvanized Steel", Corrosion & Potection, vol. 34, No. 2, Feb. 2013, pp. 114-116, & 141.
Li Gao, "Simultaneous Collection and Determination of Sulfur Dioxide, Hydrogen Fluoride and Nitrogen Oxides by Sodium Hydroxide-Glycerol Solution", Yunnan Metallurgy, vol. 41, No. 6 (Sum vol. 237), Dec. 2012, pp. 56-59.
Yang Li et al., "Study on Colorimetric Method of the Thin Alkali Glycerol Absorbs Sulfur Dioxide", Chemical Engineer, Sum vol. 95, No. 3, Jun. 2003, pp. 32-33.

* cited by examiner

METHOD FOR REMOVING SO$_x$ FROM GAS USING ETHYLENE GLYCOL COMPOSITE SOLUTION

TECHNICAL FIELD

This invention relates to a purification method of flue gas, waste gas and/or industrial raw material gas containing sulfur, in particular to a method for removing SO$_x$ (x=2 and/or 3) from flue gas, waste gas and/or industrial raw material gas containing SO$_x$.

BACKGROUND

The consumption and discharge of the flue gas, industrial raw material gas and other waste gases containing sulfur are increasing day by day due to the rapid development of industries. Discharge of waste gas containing sulfur has caused serious environmental pollutions, such as the formation of acid rain, acid corrosion of construction, respiratory diseases and skin diseases, etc., which are directly harmful to human health. Over years, scientific and technological researchers in various countries have intensively studied the desulfurization process of the flue gas, industrial raw material gas and other waste gases containing sulfur and accumulated a lot of research data. The desulfurization of the flue gas, industrial raw material gas and other waste gases containing sulfur has increasingly received much attention with the increased environmental consciousness. However, there are no significant progresses in the desulfurization techniques of the flue gas, industrial raw material gas and other waste gases containing sulfur till today. The desulfurization of the flue gas, industrial raw material gas and other waste gases containing sulfur is still a challenging problem.

The existing desulfurization processes of the flue gas, industrial raw material gas and other waste gases containing sulfur mainly include two types, wet desulfurization and dry desulfurization. The wet desulfurization specifically includes water washing method, limestone and limewater method, alkali metal solution method, alkaline solution method, ammonia method and alkylol amine method etc. . . . . The dry desulfurization specifically includes iron oxide method, zinc oxide method, manganese oxide method, cobalt oxide method, chromium oxide method, molybdenum oxide method, and activated carbon method etc. . . . . The water washing method, limestone and limewater method are mainly used in China. The limestone and limewater method, alkali metal solution method, alkaline solution method, ammonia method and alkylol amine method are widely used in developed countries. The water washing method has the disadvantages that a great deal of water is consumed, the used water cannot be recycled, serious secondary pollution has been caused by the discharge of waste water containing sulfur and the desulfurization effect is poor. The limestone and limewater method is better than the water washing method. However, the limestone and limewater method has the disadvantages of generating more solid wastes such as calcium sulfate, calcium sulfite and calcium carbonate, consuming a great deal of limestone and calcium oxide, huge equipment, large investment, and the equipment being inclined to be clogged due to the generated solid precipitates during the absorption process. Further, calcium hydroxide is preferentially reacted with carbon dioxide during the absorption process due to the limestone and calcium hydroxide having small solubilities in water, and then with sulfur oxides, thus the desulfurization effect of limewater method is not desirable. In addition, the limewater method has the disadvantages of more sewage discharge and serious secondary pollution. The alkali metal solution method, alkaline solution method, ammonia method and alkylol amine method are mainly used for the desulfurization of flue gas with relatively high content of sulfur dioxide (tail gases of smelting such as steel smelting and copper smelting, in which the sulfur dioxide content can be up to 8% or more), and the removed sulfur dioxide is recovered. These methods are not suitable for the desulfurization of general flue gas due to the relatively high requirements for the techniques, relatively high energy consumption and high demand for material of the equipment. Meanwhile, corrosion to the equipment is dramatically serious for all the currently used desulfurization processes of the flue gas, industrial raw material gas and other waste gases containing sulfur.

So far, various gases are seldom subjected to desulfurization treatment before being discharged into atmosphere. The gases still have relatively high content of sulfur even if they are subjected to desulfurization treatment. The existing desulfurization methods such as HiPure method, Benfield method, G-V method, A.D.A method, water washing method, limestone and limewater method, alkali metal solution method, alkaline solution method, ammonia method, alkylol amine method, tannin extract method, and sulfolane method, as well as the dry desulfurization methods such as iron oxide method, zinc oxide method, manganese oxide method, cobalt oxide method, chromium oxide method, molybdenum oxide method, and activated carbon method are mainly used as primary desulfurization methods for removing hydrogen sulfide from industrial raw material gases, but are not commonly used for removing hydrogen sulfide from general gases. The main reasons for this are that these desulfurization methods have low desulfurization efficiency, high operating costs, high equipment investments, serious corrosion to equipment, undesirable desulfurization effects, and poor removal rate for organic sulfur[1-3]. The desulfurization technique by low-temperature methanol[4] is a method of physically adsorbing hydrogen sulfide, carbon oxysulfide, carbon disulfide and carbon dioxide and is commonly used for decarbonization and desulfurization of raw material gases in modern large-scale chemical enterprise. However, since methanol has low boiling point, is volatile, and has high saturated vapour pressure, it is usually required to operate under high pressure and at low temperature (less than −10° C.) and thus the energy consumption is high, methanol loss is serious, the process is complicated, the operation is tedious, and the comprehensive operating expense is high. The normal-temperature methanol method[5] is a method of absorbing hydrogen sulfide, carbon oxysulfide, carbon disulfide and carbon dioxide in gas by a mixed solution of 60% methanol and 40% diethanolamine and then releasing hydrogen sulfide, carbon oxysulfide, carbon disulfide and carbon dioxide by heating and reducing pressure. However, since methanol has low boiling point, is volatile, and has high saturated vapour pressure, the released gas contains a great deal of methanol, thereby resulting in variable solution composition and serious methanol loss. In addition, the chemical stability of the solution is poor for the reasons that the diethanolamine is prone to oxidative decomposition after being exposed to daylight and air. Therefore, the solution regenerating method has to be after the mixed gas of the hydrogen sulfide, carbon oxysulfide, carbon disulfide and carbon dioxide are regenerated and released by heating and reducing pressure, then using Claus method to convert the released gases containing sulfur into sulfur. This leads to high energy consumption, serious loss of methanol and diethanolamine, complicated process, tedious operation, and high comprehensive operating expense. The methods described above are mainly used for removing organic sulfur such as hydrogen sulfide, carbon oxysulfide, and carbon disulfide in gas, but not used for removing $SO_2$ and/or $SO_3$ in gas.

An equilibrium curve for an aqueous solution of glycerol (glycerin) absorbing sulfur dioxide was tested[6], and it was found that the aqueous solution has a poor absorption capability for sulfur dioxide, thus it can not be directly used as the desulfurization agent for absorbing sulfur dioxide in flue gas; glycerol (glycerin) is added to an aqueous solution containing $Cl^-$ or an aqueous solution containing sodium hydroxide as a stabilizing agent for analyzing the content of sulfur dioxide in a gas[7-10], but it is not used as the desulfurization agent for removing sulfur dioxide in flue gas, and after the solution containing glycerol has absorbed sulfur dioxide, it can not be regenerated to release the sulfur dioxide, thus the solution can not be used as a solvent for flue gas desulfurization; A urotropine aqueous solution containing glycerol (glycerin) is also proposed to absorb $SO_2$ in flue gas[11]. However, it is found that urotropine tends to be oxidative decomposed by oxygen gas present in the flue gas after contacting with it in practical experiment, causing the chemical property of the solution to be unstable. In addition, urotropine as a product of chemical and medical is expensive and is not readily available. Therefore, this method fails to be widely used due to high operating costs and unstable desulfurization performance.

A buffer solution of acetic acid and ammonia containing $Fe^{2+}$ and $Fe^{3+}$ [12-14] has been used for desulfurization of semi-water gas, which has relatively high desulfurization efficiency and relatively low corrosion. However, the solution is unstable due to ionic effect and salt effect. In the method of iron-alkaline solution catalyzed decarbonization, desulfurization, and decyanation from gas, an aqueous solution of alkaline substance containing iron ions is used for absorbing the sulfur in the gas. This method is capable of removing various types of sulfur and has better desulfurization effect than the conventional gas wet desulfurization method for the gas having low sulfur content. However, the iron ions are less stable in the alkaline solution and a large amount of precipitate of ferric hydroxide or ferrous hydroxide will be produced. Simultaneously, a large amount of precipitate of ferric sulfide or ferrous sulfide will be produced when the iron-alkaline solution is contacted with gas containing sulfide. Thus the content of iron ions in the solution decreases rapidly and the desulfurization effect significantly reduces. In addition, the phenomenon of clogging the desulfurization tower will occur. Therefore, this method is not suitable for the desulfurization of gas having high sulfur content[15]. In order to improve this situation, we attempt to carry out the desulfurization by "iron-alkaline solution" containing microorganisms under normal pressure or increased pressure and a good effect is achieved[16]. Furthermore, it is suggested to absorb hydrogen sulfide by ethylene glycol, or ethylene glycol ester, or diethylene glycol monomethyl ether solution. Then, sulfur dioxide gas is blown into the organic solution with absorbed hydrogen sulfide, and hydrogen sulfide is reacted with sulfur dioxide to produce sulfur so as to allow the organic solution to be regenerated and recycled for use[17-19]. Although the method for regenerating the ethylene glycol solution containing hydrogen sulfide by sulfur dioxide is very simple, sulfur dioxide is limited in supply and is not readily available. In addition, it is required for special device and safety measure during transportation. Therefore, this method has disadvantages that the operating cost is high and the safety measure is strict. It is proposed to absorb hydrogen sulfide, organic sulfur and water in natural gas or other gases by ethylene glycol solution, or a mixed solution of ethylene glycol and alkanolamine, or a mixed solution of ethylene glycol, alkanolamine, and sodium carbonate, or ethylene glycol dimethyl ether or diethanol dimethyl ether solution, or a mixed aqueous solution of diethylamine, diethylene glycol, triethylene glycol and triethylene glycol methyl ether, or a mixed solution of amine and acetaldehyde, or a mixed aqueous solution of diethylene glycol monomethyl ether and ferric nitrilotriacetate[20-28]. However, currently these processes described above are only used in the desulfurization of industrial raw material gas in large scale to remove hydrogen sulfide, carbon oxysulfide, and carbon disulfide in gas, but not used in the desulfurization of flue gas and other waste gases to remove $SO_x$ (including sulfur dioxide and/or sulfur trioxide). Our earlier patent techniques of "Method for removing $SO_x$ from gas by polyethylene glycol (Patent No. ZL200910009058.1)" and "Method for removing $SO_x$ from flue gas by ethylene glycol (Patent No. ZL200710110446.X)" have good desulfurization effects during practical industrialized production tests. However, during regeneration by heating, as the boiling point of ethylene glycol is only 197° C., there will be some loss of ethylene glycol, and meanwhile, a small amount of the ethylene glycol and polyethylene glycol solutions will deteriorate, which will increase the operating costs and affect desulfurization efficiencies. It has been found by further theoretical studies that sulfur dioxide or sulfur trioxide mainly interacts with hydroxyl groups in the molecules of ethylene glycol or polyethylene glycol and simultaneously is weakly bound to ether linkage in polyethylene glycol when interacting with ethylene glycol or polyethylene glycol. The interacting mechanisms are as follows: Taking ethylene glycol and diethylene glycol as examples only, the chemical reactions are as follows:

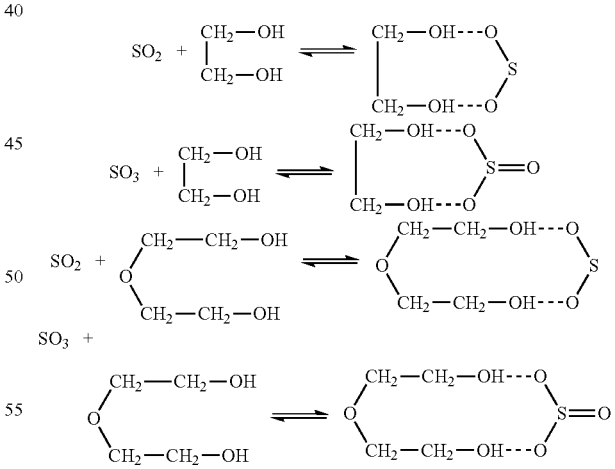

The following weak bindings will occur besides the above main reactions:

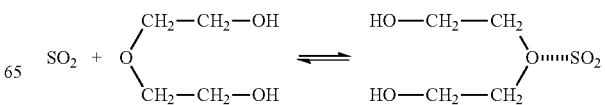

-continued

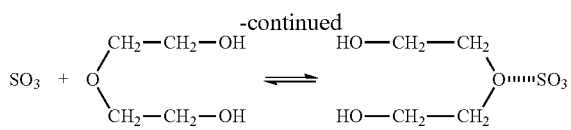

The following side reactions will occur during regeneration by heating:

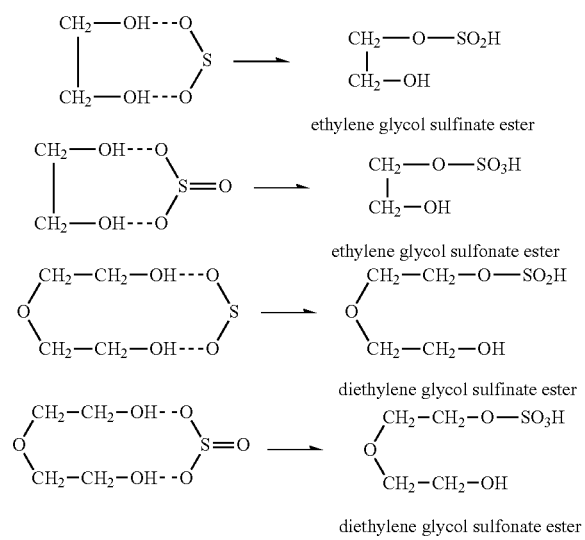

From our current research results, it can be seen that these side reactions may be irreversible reactions. That is to say, there is so far no way to reverse these side reactions. The resulting sulfinate esters and sulfonate esters cannot be regenerated to release sulfur dioxide or sulfur trioxide. The capability of the solution to absorb sulfur will decrease as the amount of sulfinate esters and sulfonate esters in the solution increases. The solution deteriorates, thereby damaging the system and even making the system unworkable.

REFERENCES

[1] Benson, H. E. Parrish, R. W. (1974) HiPure Process Removes $CO_2/H_2S$. Hydrocarbon Processing, April. 81-82.
[2] Jenett, E. (1962), Giammarco-Vetrocoke Process. The Oil and Gas Journal. April 30, 72-79.
[3] F. C. Riesenfeld, A. L. Kohl, translated by Yusheng Shen, <Gas Purification>, Beijing, China Architecture & Building Press, 1982.
[4] Wenbin Dai, Hongqing Tang, <Computer and Applied Chemistry>, 1994, 11(1), P 44-51.
[5] Bin Ma, <Coal Chemical Industry>, 1994, Vol. 68, P 35-38.
[6] Zhiqiang He, Jinrong Liu, Lijun Li, Dawei Lan, and Jianbin Zhang, Absorption Properties and Spectroscopic Studies of Dilute Sulfur Dioxide in Aqueous Glycerol Solutions, Ind. Eng. Chem. Res. 2012, 51, 13882-13890.
[7] B. L. Wedzicha & P. P. Webb, Vapour pressure of $SO_2$ above solutions of sulphur (IV) oxospecies: the effects of chloride ion and glycerol, Food Chemi.wy, 1996, 55 (4), 337-341.
[8] Zheng Hui, Junxi Zhang, Xianwu Ji, Qunjie Xu, Fu Zhang, Daquan Zhang, Glycerine-water Solution Humidity-controlling Method and its Effects on $SO_2$ Atmospheric Corrosion of Hot Galvanized Steel, Corrosion and Protection, 2013, 34 (2), 114-116.
[9] Li Gao, Simultaneous Collection and Determination of Sulfur Dioxide, Hydrogen Fluoride and Nitrogen Oxides by Sodium Hydroxide-Glycerol Solution, Yunnan Metallurgy, 2012, 41 (6), 56-59.
[10] Yang Li, Yueqiang Liu, Study on colorimetric method of the thin alkali glycerol solution absorbs sulfur dioxide, Chemical Engineer, 2003, 95 (3), 32-33.
[11] Zh. Prikl. Khim. (S.-Peterburg), 1993, 66 (10), 2383-2385 (Russian).
[12] Xionghui Wei, Qianhuan Dai, Zhongming Chen, Kesheng Shao, Chending Zhang, Principle of Desulfurization by Buffer Aqueous Solution of Alkaline Iron Salt, Journal of Chemical Engineering, 1998, 49 (1), 48-58.
[13] Xionghui Wei, (1994) Novel method of Desulfurization and Deoxygenation for Semi-water Gas, Chinese patent publication CN1087110.
[14] Xionghui Wei, (1996) Decarbonization and Desulfurization Method by Pressurized Iron-alkaline Solution, Chinese patent publication CN1133817.
[15] Xionghui Wei, Meihua Zou, Fenghui Wei, (1999) Decarbonization, Desulfurization and Decyanation Method for Gas by Iron-alkaline Solution via Catalysis, Chinese patent No. ZL99100596.1.
[16] Xionghui Wei, (2002) Desulfurization Method for Gas by Biochemical Iron-alkaline Solution via Catalysis, Chinese patent No. ZL02130605.2.
[17] Galeeva R. G., Kamalov Kh. S., Aminov M. Kh., Gafiatullin R. R., Mitina A. P., Bakhshijan D. Ts., Safin G. R., Levanov V. V., Installation for Complete purification of Petroleum and Nattural Gases, RU2070423C1.
[18] Biedermann, Jean-Michel, Process for Eliminating Hydrogen Sulphide Contained in Gas Mixture, PCT/FR83/00174.
[19] Biedermann, Jean-Michel, etc., Process for Eliminating Hydrogen Sulphide Contained in Gas Mixture, FR2532190-A1.
[20] Muraoka Hiromitsu, Dehydration Method by Ethylene Glycol, JP62-95118A.
[21] German Patent, Dehydration Method by Ethylene Glycol, DT2333708A1.
[22] The Former Soviet Union Patent, SU1611411A1.
[23] Komuro Takeyong, JP6-228573A.
[24] The Former Soviet Union Patent, SU655410A.
[25] WYSCHOF SKY Michael, HOBERG Dirk, Method for the Separation of Gaseous Components from Technical Gases by Means of Ethylene Glycol Dimethyl Ethers at Low Temperatures, WO03011432A1(PCT/EP02/07915).
[26] The Former Soviet Union Patent, SU927282B.
[27] DILLON Edward Thomas, Composition and Method for Sweetening Hydrocarbons, WO9007467A1(PCT/US89/05742).
[28] Zaida Diaz, Process for the Removal of $H_2S$ and $CO_2$ from Gaseous Streams, U.S. Pat. No. 4,368,178.

SUMMARY OF INVENTION

In order to solve the deficiencies described above in our earlier patents of "Method for removing $SO_x$ from gas by polyethylene glycol (Patent No. ZL200910009058.1)" and "Method for removing $SO_x$ from flue gas by ethylene glycol (Patent No. ZL200710110446.X)", raise the boiling point of the solution, reduce the loss of solvents while increasing the desulfurization capability of the solution, and avoid or significantly reduce the generation of sulfinate esters and sulfonate esters, the present invention uses an ethylene glycol composite solution consisting of ethylene glycol and/or polyethylene glycol along with an organic acid containing no nitrogen atom in a molecule and/or an organic acid salt containing no nitrogen atom in a molecule to absorb SO$_x$ from a gas, wherein the organic acid and/or organic acid salt containing no nitrogen atom in a molecule includes an organic monoacid, an organic monoacid salt, an organic polyacid and an organic polyacid salt containing no nitrogen atom in a molecule. In the ethylene glycol composite solution consisting of ethylene glycol and/or polyethylene glycol along with the organic acid and/or organic acid salt containing no nitrogen atom in a molecule, ethylene glycol and/or polyethylene glycol will form stable associated substance with the organic acid and/or organic acid salt containing no nitrogen atom in a molecule via hydrogen bond, and will also form stable esters, thus the ethylene glycol composite solution is significantly enhanced in stability, the ethylene glycol composite solution is significantly improved in resistance to deterioration by acid or base, and also the boiling point of the ethylene glycol composite solution is increased significantly.

Hereinafter ethylene glycol and diethylene glycol along with citric acid and its salts will be taken as examples only to illustrate the esterification mechanism of the ethylene glycol composite solution of the present invention, but the ethylene glycol composite solution of the present invention is not limited as consisting only of ethylene glycol and/or diethylene glycol along with citric acid and its salts, it is an ethylene glycol composite solution consisting of ethylene glycol and/or polyethylene glycol along with an organic acid and/or organic acid salt containing no nitrogen atom in a molecule.

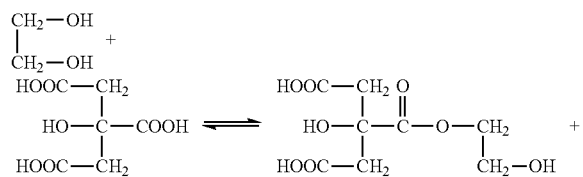

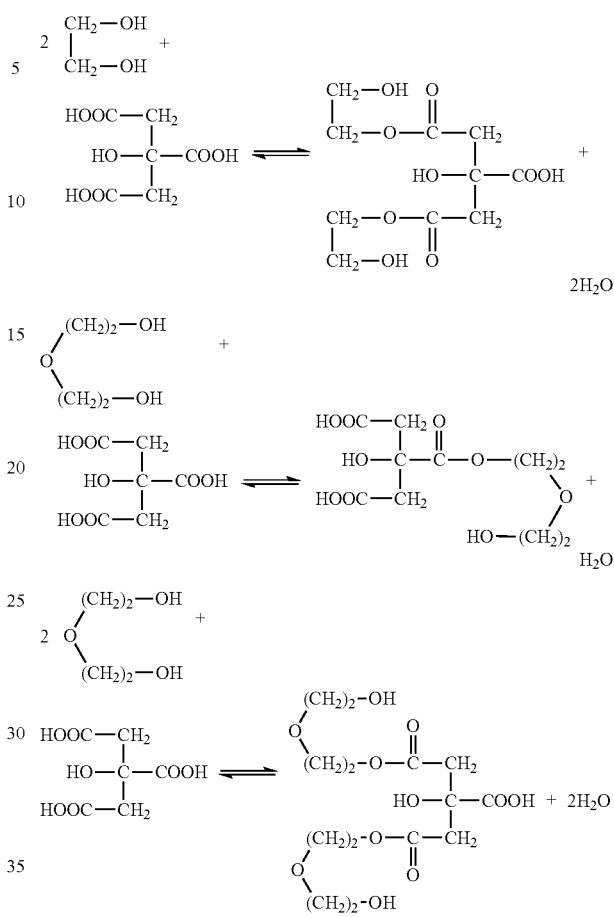

In the following formulae, M represents a metal ion, such as sodium ion, potassium ion, magnesium ion, calcium ion and/or a transition metal ion.

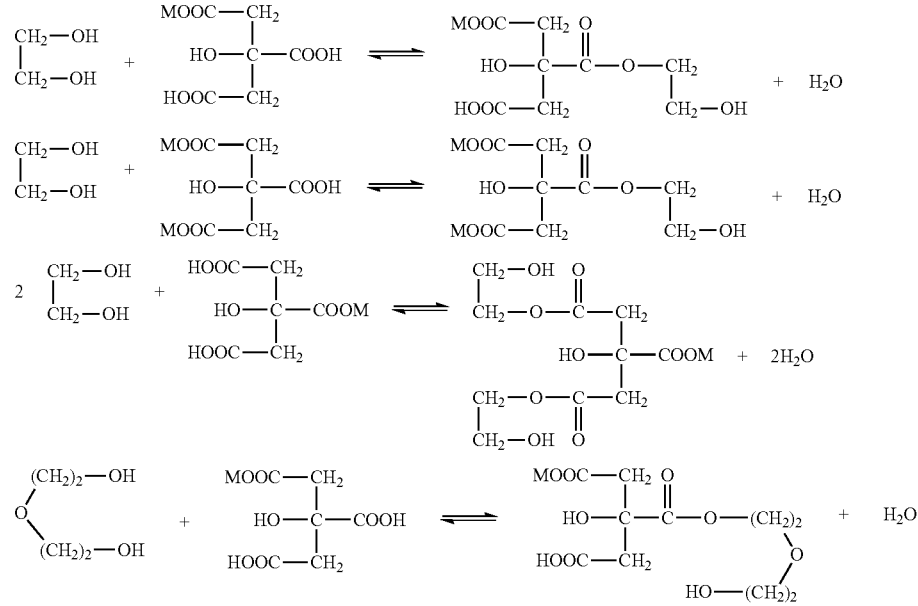

-continued

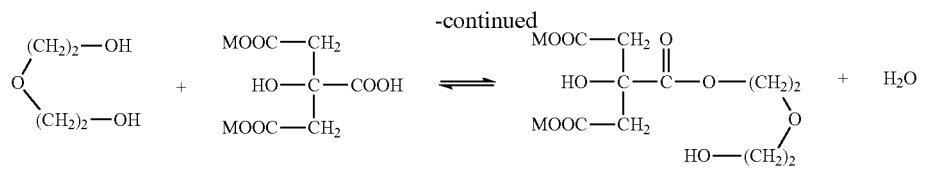

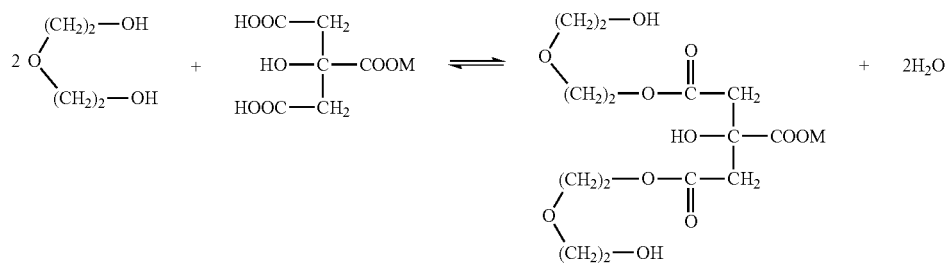

In the desulfurization method by ethylene glycol composite solution according to the present invention, first, an ethylene glycol composite solution is used to absorb $SO_x$ (x=2 and/or 3) in a gas, and then the ethylene glycol composite solution with absorbed $SO_x$ is regenerated by one or more of a heating method, a vacuum method, a gas stripping method, an ultrasonication method, a microwave method, and a radiation method, and the regenerated ethylene glycol composite solution is recycled for use. According to the desulfurization method by ethylene glycol composite solution of the present invention, there are no special requirements for the total content of $SO_x$ in the gas containing sulfur before desulfurization. However, in order to achieve a better desulfurization effect, it is preferred that the total content of $SO_x$ in the gas containing sulfur should be less than 99.9% (volume percent).

In the desulfurization method by ethylene glycol composite solution according to the present invention, there are no strict restrictions on processing conditions. However, it is preferred that the absorption is performed under a normal or increased pressure and the absorption temperature is preferably −20 to 80° C. Next, the composite solution with absorbed $SO_x$ is regenerated by one or more of a heating method, a vacuum method, a gas stripping method, an ultrasonication method, a microwave method, and a radiation method. Preferably, the regeneration temperature is 0-300° C.

The ethylene glycol composite solution is an ethylene glycol composite solution consisting of ethylene glycol and/or polyethylene glycol along with an organic acid containing no nitrogen atom in a molecule and/or an organic acid salt containing no nitrogen atom in a molecule, in which the total mass content of ethylene glycol and/or polyethylene glycol along with the organic acid containing no nitrogen atom in a molecule and/or the organic acid salt containing no nitrogen atom in a molecule is more than or equal to 50%, and the mass content of water is less than 50%.

In the desulfurization method by ethylene glycol composite solution according to the present invention, when the ethylene glycol composite solution with absorbed $SO_x$ is regenerated by one or more of a heating method, a vacuum method, a gas stripping method, an ultrasonication method, a microwave method, and a radiation method; and sulfur dioxide and/or sulfur trioxide are byproducts.

The fundamental principle of the present invention is as follows:

Hereinafter ethylene glycol along with citric acid and/or citric acid salt, as well as diethylene glycol along with citric acid and/or citric acid salt will be taken as examples for better explaining the principle of removing $SO_x$ from a gas by ethylene glycol composite solution, but the ethylene glycol composite solution of the present invention is not limited to a solution consisting only of ethylene glycol along with citric acid and/or citric acid salt, or diethylene glycol along with citric acid and/or citric acid salt, and it can not be construed as limiting the claims of the present invention.

The following absorption reactions take place when a flue gas or another gas containing $SO_x$ is contacted with the ethylene glycol composite solution:

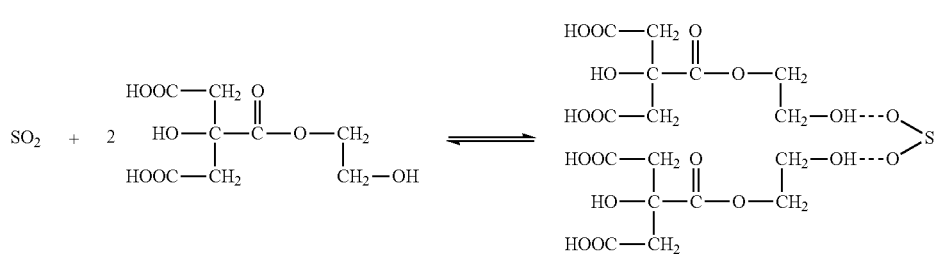

-continued
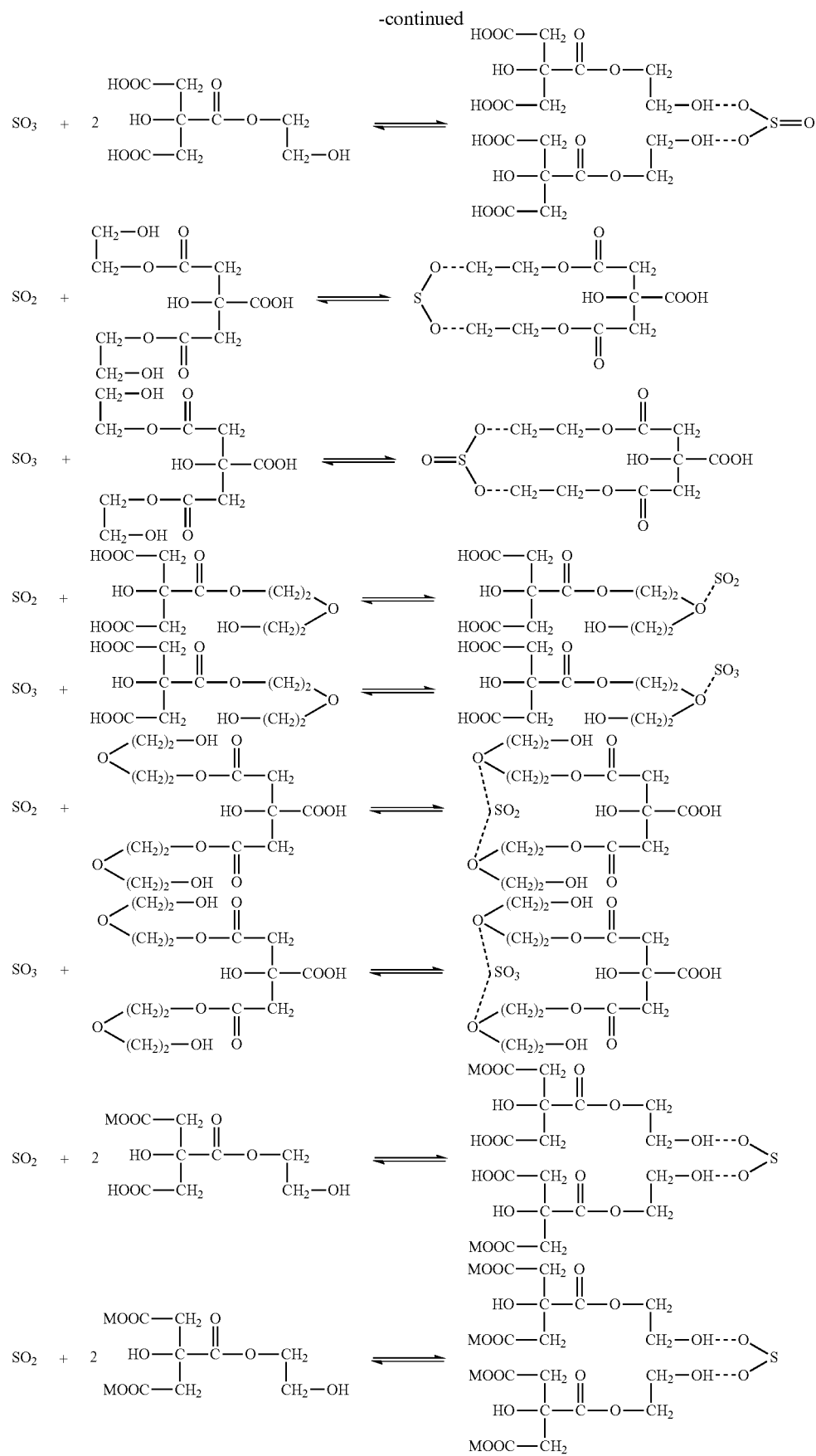

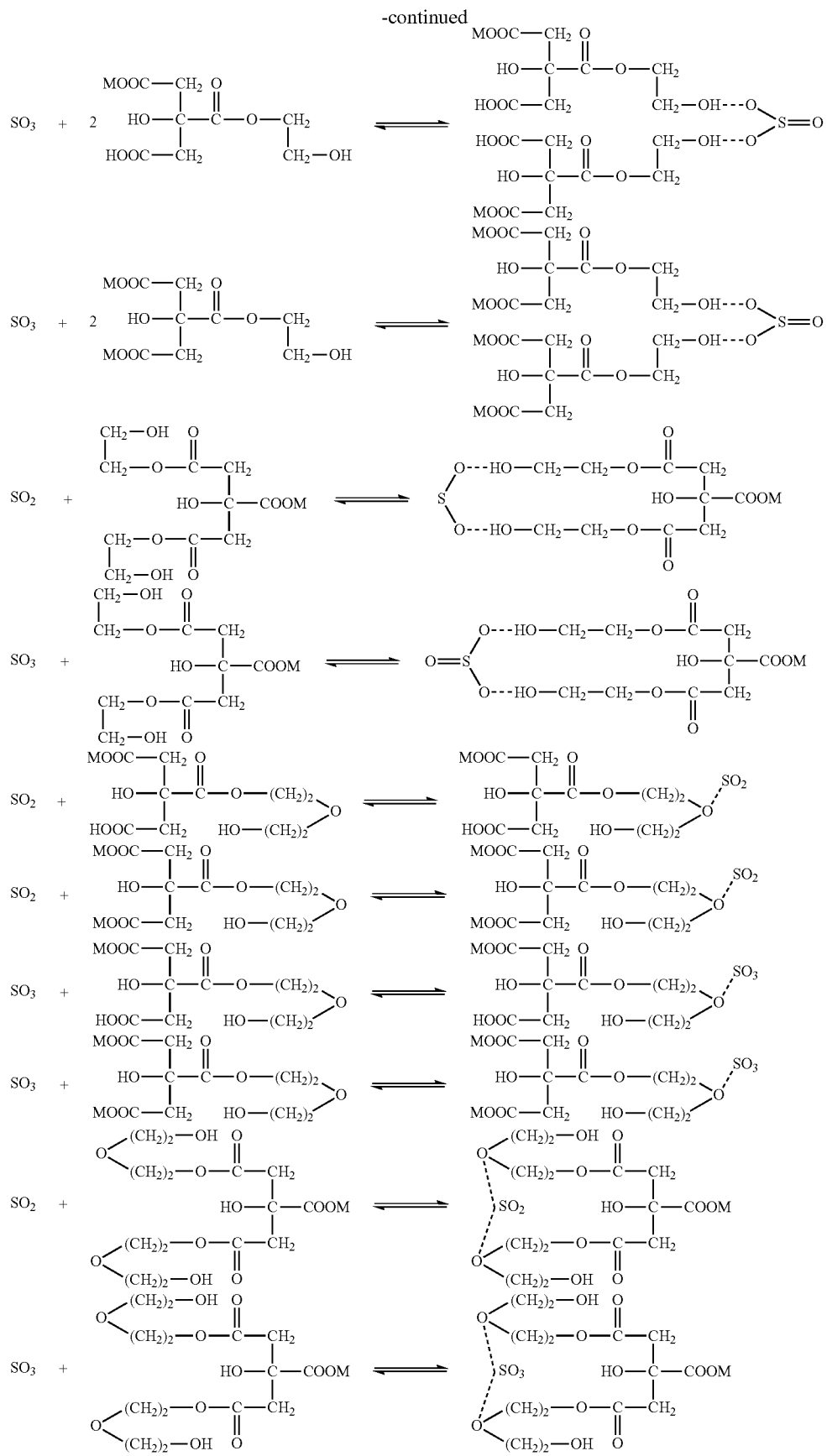

The ethylene glycol composite solution with absorbed sulfur dioxide and sulfur trioxide is converted into a rich liquor, flows out from the bottom of desulfurization tower and flows into regenerator to be regenerated by one or more of a heating method, a vacuum method, a gas stripping method, an ultrasonication method, a microwave method, and a radiation method, releasing sulfur dioxide and/or sulfur trioxide of high purity. The following regeneration reactions will take place in the regenerator for the rich liquor.

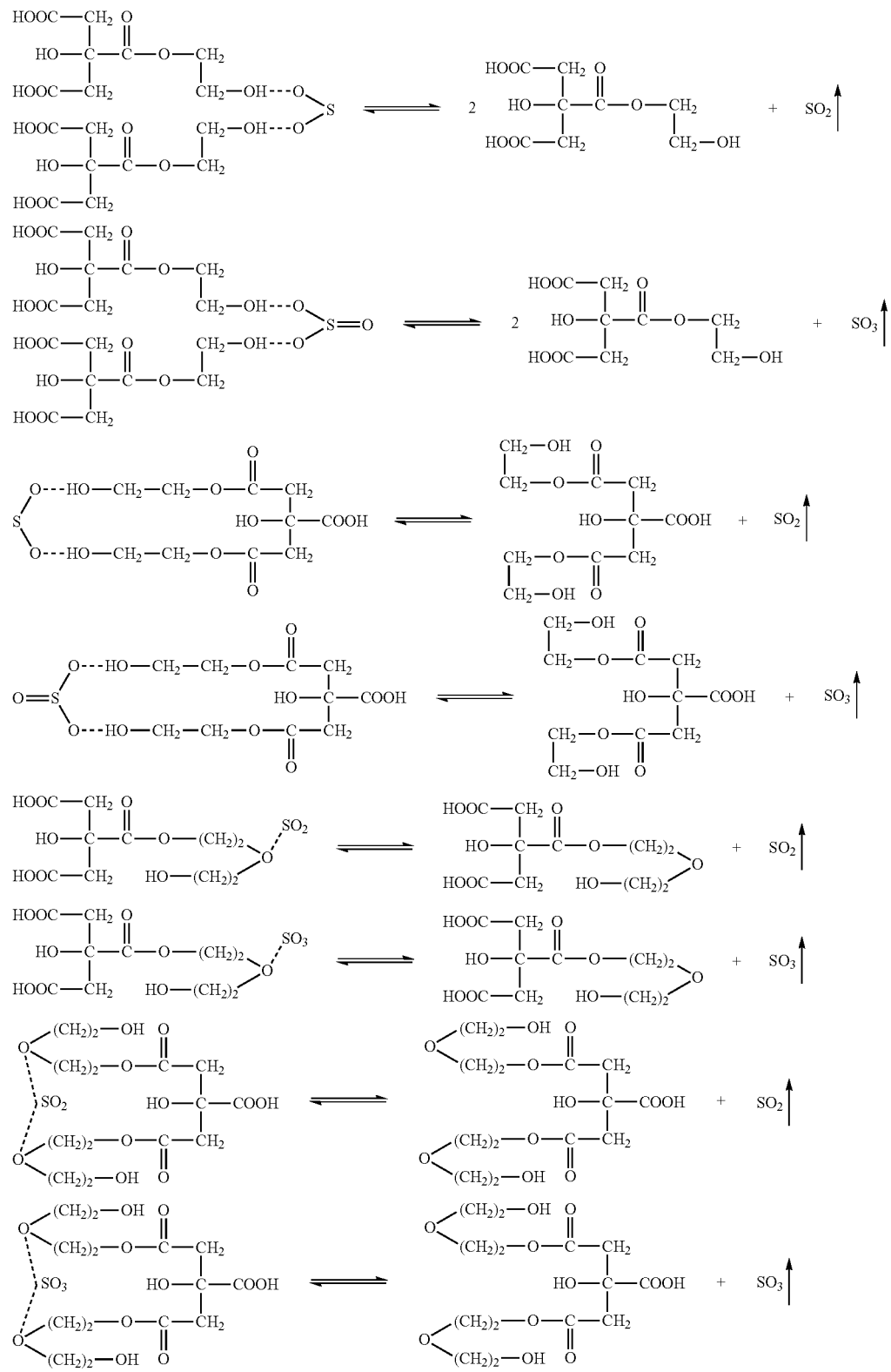

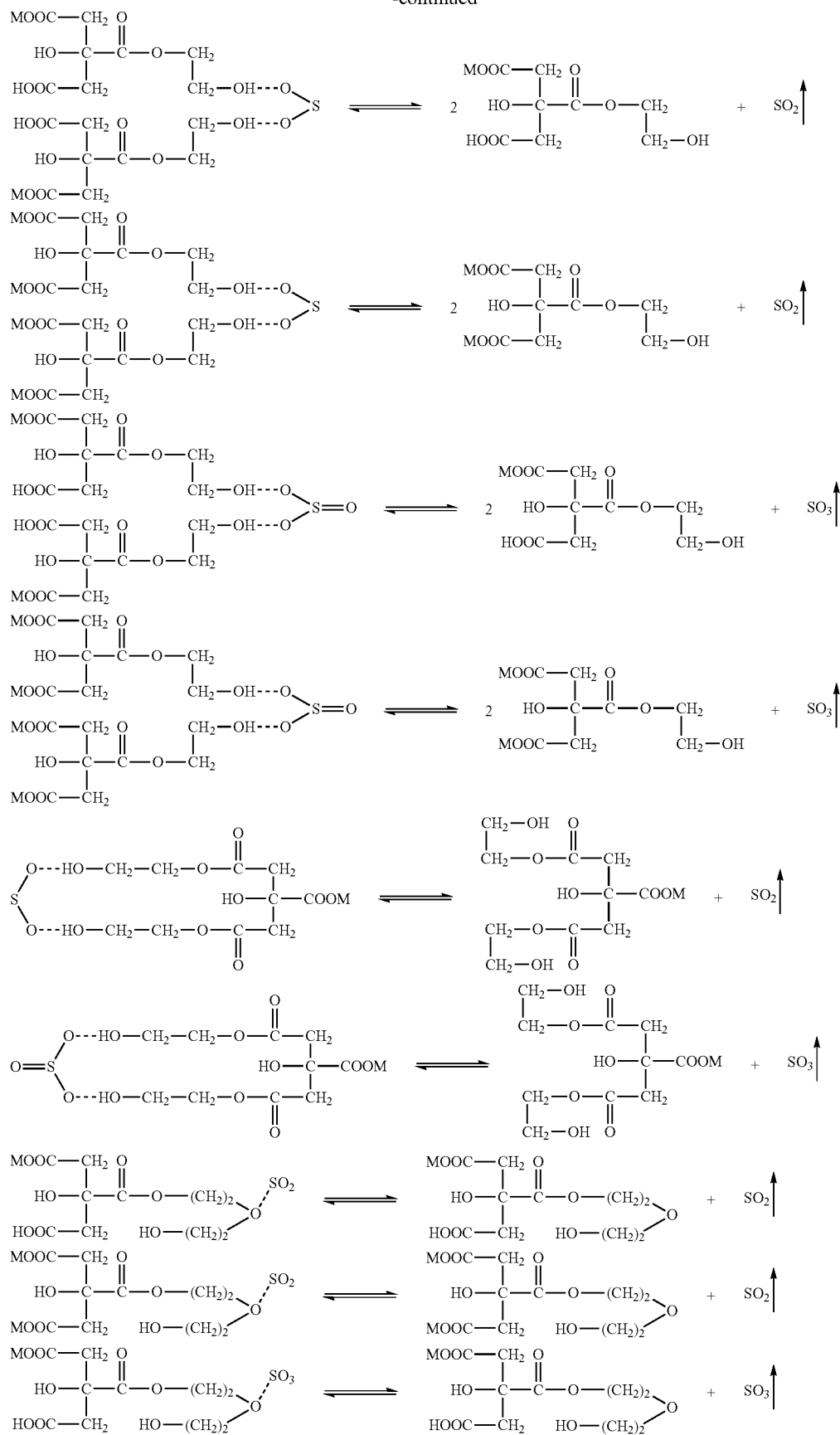

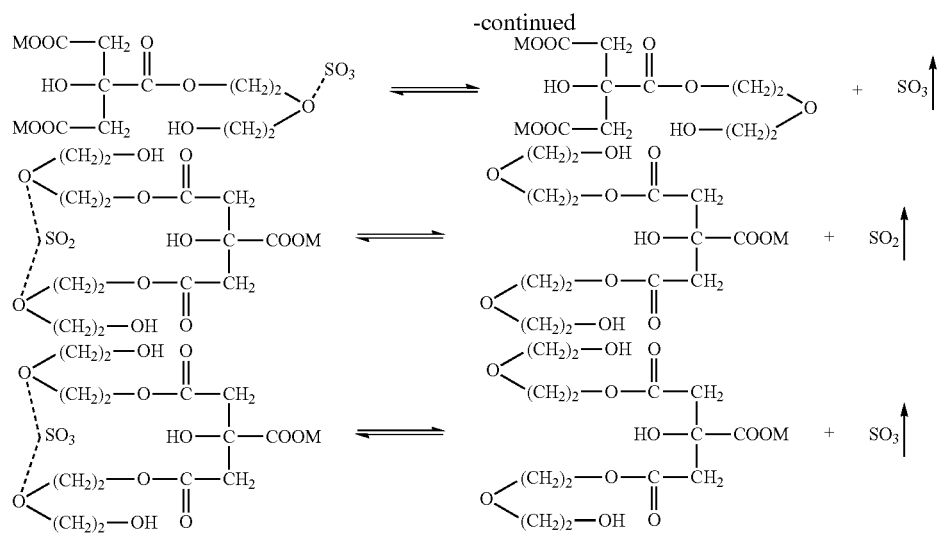

-continued

The regenerated ethylene glycol composite solution (hereinafter, simply referred to as "desulfurization solution") is recycled for use.

In order to achieve the fundamental principle described above, two processes are designed. The first process is a desulfurization-absorption process, and the second process is a regeneration process of the desulfurization solution. The regeneration methods used in the regeneration process of the desulfurization solution include a heating method, a vacuum method, a gas stripping method, an ultrasonication method, a microwave method, and a radiation method.

The first process is described as follows: The desulfurization-absorption process can be an atmospheric absorption process or a pressurized absorption process. The desulfurization-absorption process is shown in FIG. 1. The desulfurization-absorption process takes place in the desulfurization tower. Usually, the gas containing $SO_x$ is fed into the desulfurization tower from the bottom of the desulfurization tower. The regenerated desulfurization solution (usually referred to as "lean liquor") is charged into the desulfurization tower from the top of the desulfurization tower. In the desulfurization tower, the gas containing $SO_x$ is contacted with the desulfurization solution counter-currently and the $SO_x$ in the gas is absorbed by the desulfurization solution. Then, the gas with $SO_x$ removed is discharged out from the top of the desulfurization tower. The desulfurization solution with absorbed $SO_x$ in the gas is converted into "rich liquor". The "rich liquor" is discharged out from the bottom of the desulfurization tower and then flows to the regeneration process. Alternatively, both the gas and the desulfurization solution can be charged into the desulfurization tower from the top of the desulfurization tower during the absorption process. The absorption process is carried out co-currently in the desulfurization tower.

The second process is the regeneration process of the desulfurization solution. The regeneration methods used include a heating method, a vacuum method, a gas stripping method, an ultrasonication method, a microwave method, and a radiation method.

The schematic flow diagram of the regeneration by heating method is shown in FIG. 2. The regeneration manner is that the desulfurization "rich liquor" with absorbed $SO_x$ is charged into a heating-regenerator and regenerated by heating to release $SO_2$ and/or $SO_3$. The regenerated desulfurization solution by heating is generally referred to as desulfurization "semi-lean liquor" or "lean liquor". The "semi-lean liquor" or "lean liquor" can be transferred directly to the desulfurization-absorption process to be used repeatedly. Alternatively, it can be continually transferred to another regenerator for further regeneration by another regeneration method and then transferred to the desulfurization-ab sorption process to be used repeatedly.

The schematic flow diagram of the regeneration by a vacuum method is shown in FIG. 3. The regeneration manner is that the desulfurization "rich liquor" with absorbed $SO_x$ is charged into a vacuum regenerator and regenerated by evacuation to release $SO_2$ and/or $SO_3$. The regenerated desulfurization solution by evacuation is generally referred to as desulfurization "semi-lean liquor" or "lean liquor". The "semi-lean liquor" or "lean liquor" can be transferred directly to the desulfurization-absorption process to be used repeatedly. Alternatively, it can be continually transferred to another regenerator for further regeneration by another regeneration method and then transferred to the desulfurization-ab sorption process to be used repeatedly.

The schematic flow diagram of the regeneration by gas stripping method is shown in FIG. 4. The regeneration manner is that the desulfurization "rich liquor" with absorbed $SO_x$ is charged into a gas stripping-regenerator. An inert gas (such as nitrogen, carbon dioxide, argon, and water vapour, etc.) is fed from the bottom of the gas stripping-regenerator. At this time $SO_2$ and/or $SO_3$ are carried out from the desulfurization "rich liquor" by the inert gas, and the desulfurization solution is regenerated. The regenerated desulfurization solution by gas stripping is generally referred to as desulfurization "semi-lean liquor" or "lean liquor". The "semi-lean liquor" or "lean liquor" can be transferred directly to the desulfurization-absorption process to be used repeatedly. Alternatively, it can be continually transferred to another regenerator for further regeneration by another regeneration method and then transferred to the desulfurization-absorption process to be used repeatedly.

The schematic flow diagram of the regeneration by ultrasonication method and/or microwave method or radiation method is shown in FIG. 5. The regeneration manner is that the desulfurization "rich liquor" with absorbed $SO_x$ is charged into an ultrasonication- and/or microwave- or radiation-regenerator and regenerated by ultrasonication and/or microwave or radiation to release $SO_2$ and/or $SO_3$. The regenerated desulfurization solution by ultrasonication, and/or microwave, or radiation is generally referred to as desulfurization "semi-lean liquor" or "lean liquor". The "semi-lean liquor" or "lean liquor" can be transferred directly to the desulfurization-absorption process to be used repeatedly. Alternatively, it can be continually transferred to another regenerator for further regeneration by another regeneration method and then transferred to the desulfurization-absorption process to be used repeatedly.

Two or more regeneration process of the heating method, vacuum method, gas stripping method, ultrasonication method, microwave method, and radiation method described above may be combined in one regenerator.

The ethylene glycol composite solution according to the present invention is a solution consisting of ethylene glycol and/or polyethylene glycol along with an organic acid containing no nitrogen atom in a molecule and/or an organic acid salt containing no nitrogen atom in a molecule, in which the total mass content of ethylene glycol and/or polyethylene glycol along with the organic acid containing no nitrogen atom in a molecule and/or the organic acid salt containing no nitrogen atom in a molecule is more than or equal to 50%, and the mass content of water is less than 50%.

In the ethylene glycol composite solution according to the present invention, the organic acid and/or organic acid salt containing no nitrogen atom in a molecule refers to an organic monoacid, an organic monoacid salt, an organic polyacid and an organic polyacid salt containing no nitrogen atom in a molecule, wherein the organic monoacid containing no nitrogen atom in a molecule is an organic compound containing no amine group and containing only one carboxylic acid group in a molecule, such as formic acid, acetic acid, butyric acid and the like; the organic monoacid salt containing no nitrogen atom in a molecule contains no amine group and contains only one carboxylic acid group in a molecule, with the carboxylic acid group bonding to ions, such as sodium ions and/or potassium ions and/or magnesium ions and/or calcium ions and/or transition metal ions, thus forming carboxylic acid salts, such as formic acid salts, acetic acid salts, butyric acid salts and the like. When formulating the ethylene glycol composite solution, these organic monoacid salts containing no nitrogen atom in a molecule can be obtained by directly adding the organic monoacids containing no nitrogen atom in a molecule and metal hydroxides and/or metal carbonates to solutions to react; the organic polyacid containing no nitrogen atom in a molecule refers to an organic acid containing no amine group and containing two or more carboxylic acid groups in a same molecule, such as ethanedioic acid, propanedioic acid, butanedioic acid, tannin acid, polygallic acid, citric acid and the like; the organic polyacid salt containing no nitrogen atom in a molecule contains no amine group and contains two or more than two carboxylic acid groups in a same molecule, with at least one carboxylic acid group bonding to metal ions, such as sodium ions and/or potassium ions and/or magnesium ions and/or calcium ions and/or transition metal ions, thus forming carboxylic acid salts, such as ethanedioic acid sodium salt, propanedioic acid potassium salt, butanedioic acid potassium salt, tannin acid potassium salt, polygallic acid potassium salt, citric acid potassium salt and the like. When formulating the ethylene glycol composite solution, these organic polyacid salts containing no nitrogen atom in a molecule can be obtained by directly adding the organic polyacids containing no nitrogen atom in a molecule and metal hydroxides and/or metal carbonates to solutions to react. The ethylene glycol composite solution according to the present invention may contain any one, or any two or more of the organic acids containing no nitrogen atom in a molecule and the organic acid salts containing no nitrogen atom in a molecule, and the mass content of the organic acid containing no nitrogen atom in a molecule and/or organic acid salt containing no nitrogen atom in a molecule in the ethylene glycol composite solution is less than 30%.

In order to improve the capability of the ethylene glycol composite solution to absorb sulfur, a certain ratio of additives can be added to the ethylene glycol composite solution according to the present invention. The additives can be organic amines, amides, sulfones, sulfoxides and metallorganic compounds. The organic amines include alkylamines (for example aliphatic amines such as monomethylamine, dimethylamine, trimethylamine, monoethylamine, diethylamine, triethylamine, monopropylamine, dipropylamine, tripropylamine, n-propyl amine, iso-propylamine, monobutylamine, dibutylamine, tributylamine, n-butylamine, sec-butylamine, iso-butylamine, tert-butylamine, ethylenediamine, propanediamine, hexamethylenediamine, triethylenediamine, diethylenetriamine, triethylenetetraamine, tetraethylenepentaamine, polyethylenepolyamine etc.), and aromatic amines (such as aniline, N-methylaniline, N-ethylaniline, N-propylaniline, N-butylaniline, N,N-dimethylaniline, N,N-diethylaniline, N,N-dipropylaniline, N,N-dibutylaniline, phenylenediamine, alpha-naphthylamine, halogenated aniline, nitroaniline, sulfonic aniline and the like). The amides include formylamide, acetamide, DMF, MDEA, formanilide, acetanilide, propionanilide, butyrylanilide, benzyldimethylamine, benzyldiethylamine, benzyldimethylpropylamine, benzyldibutylamine and the like; the sulfones include dimethyl sulfone, diethyl sulfone, dipropyl sulfone, dibutyl sulfone, bis-hydroxyethyl sulfone and the like; the sulfoxides include dimethyl sulfoxide (DMSO), diethyl sulfoxide, dipropyl sulfoxide, dibutyl sulfoxide and the like; the metallorganic compounds include transition metallorganic compounds. The additive in the ethylene glycol composite solution may be composed of any one, two or more compounds described above can be added to the ethylene glycol composite solution. The additives are present in the ethylene glycol composite solution in a mass content of less than 10%.

Compared with the conventional wet desulfurization process (for example calcium desulfurization process, and amine desulfurization process), the present invention has the following advantages. (1) The conventional wet desulfurization process can only be applied to the desulfurization of gas having relatively low sulfur content. The desulfurization method by ethylene glycol composite solution according to the present invention can be applied to the desulfurization of gas having low sulfur content and gas having high sulfur content. (2) For the conventional wet desulfurization process, insoluble precipitate of calcium salt or ammonium salt will be produced during the whole process of desulfurization and regeneration, causing equipments and pipes to be clogged. For the desulfurization method by ethylene glycol composite solution according to the present invention, there is substantially no insoluble precipitate of calcium salt or ammonium salt. (3) When the conventional wet desulfurization process is used for removing sulfur from flue gas, the by-products are calcium sulfate and calcium sulfite, or ammonium sulfate and ammonium sulfite. For the desulfurization method by ethylene glycol composite solution according to the present invention, the by-products are sulfur dioxide and/or sulfur trioxide of high purity, which have broad markets and significant applications as important chemical raw materials. (4) For our earlier patent techniques of "Method for removing $SO_x$ from gas by polyethylene glycol (Patent No. ZL200910009058.1)" and "Method for removing $SO_x$ from flue gas by ethylene glycol (Patent No. ZL200710110446.X)", some sulfinate esters and sulfonate esters will be produced during operation, such that the capability of the solution to absorb sulfur decreases, and the solution deteriorates, thereby damaging the system and even making the system unworkable. For the desulfurization method by ethylene glycol composite solution according to the present invention, sulfinate esters and sulfonate esters are hardly produced in the solution during operation, and the solution will not deteriorate. Therefore, the solution is stable and thus the operation is stable. In addition, according to the desulfurization method by ethylene glycol composite solution of the present invention, the purification is sufficient and the total sulfur content in gas can be steadily decreased to 50 $mg/m^3$ or less. The solution has a high boiling point, and the loss is small. The gas/liquid ratio of the desulfurization is large, and the energy consumption is low. Further, the running cost is low, the operating period is short, the investment is low and the operation is simple.

The desulfurization method by ethylene glycol composite solution according to the present invention has broad industrial applications and can be used for desulfurization of flue gas, burning gas, coke-oven gas, synthesis waste gas from dyestuff plants, sewage gas from chemical fiber plants, and other industrial raw material gases or waste gases containing $SO_x$. The total sulfur content in the above gases containing sulfur is less than 99.9% (volume percent).

DETAILED DESCRIPTION

The desulfurization method by ethylene glycol composite solution according to the present invention will be described below with reference to some specific embodiments. The embodiments described hereinafter are only for better illustrating the present invention rather than limiting the claims of the present invention.

Figure 1:
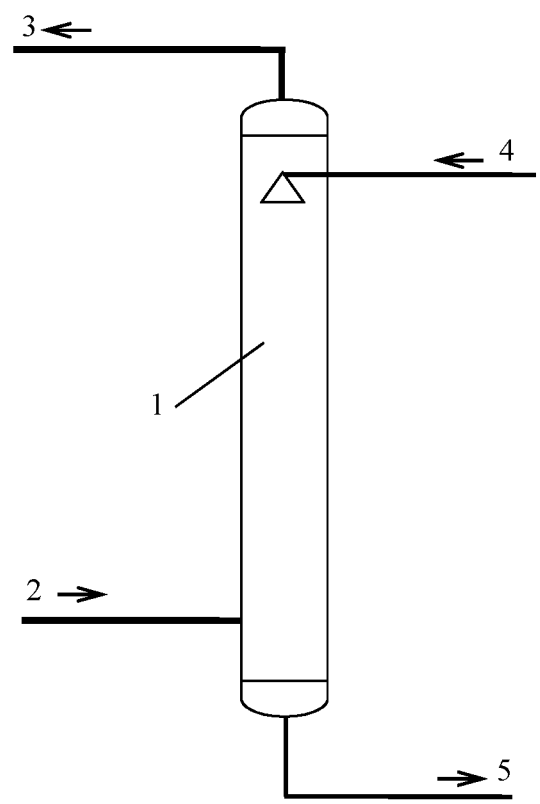
FIG. 1 is a schematic diagram of a desulfurization-absorption process.

The first process is a desulfurization-absorption process, and its embodiment is as shown in FIG. 1. The gas 2 containing $SO_x$ is fed from the bottom of the desulfurization tower 1 and contacted with the desulfurization lean liquor 4 counter-currently. The $SO_x$ in the gas 2 containing $SO_x$ is absorbed by the lean liquor 4. The gas 2 containing $SO_x$ is converted into purified gas 3 which is discharged out from the top of the desulfurization tower 1. The desulfurization lean liquor 4 with absorbed $SO_x$ is converted into desulfurization rich liquor 5 at the bottom of the desulfurization tower 1. The desulfurization rich liquor 5 is discharged out from the bottom of the desulfurization tower 1 and transferred to the desulfurization solution regeneration process to be regenerated by one or more of a heating method, a vacuum method, a gas stripping method, an ultrasonication method, a microwave method, and a radiation method.

The second process is the regeneration process of desulfurization solution. The regeneration methods for it include a heating method, a vacuum method, a gas stripping method, an ultrasonication method, a microwave method, and a radiation method.

Figure 2:
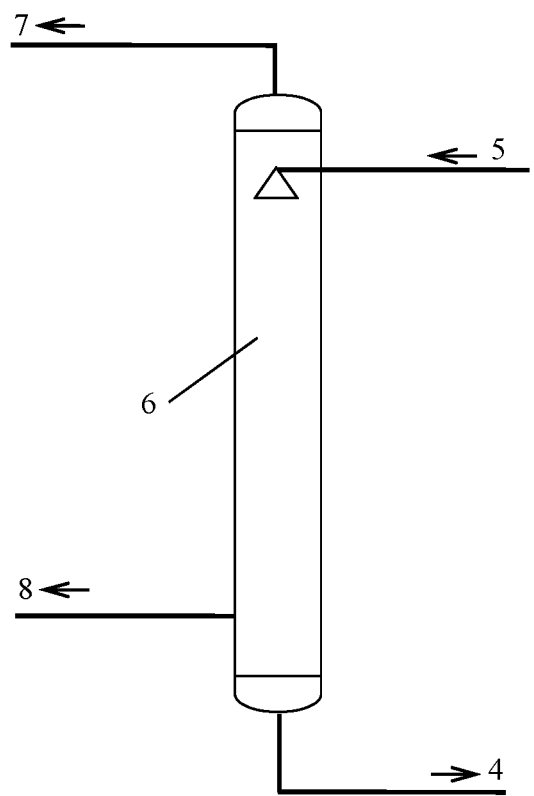
FIG. 2 is a schematic diagram of desulfurization solution regeneration by a heating method.

The embodiment of regeneration method by heating is shown in FIG. 2. The desulfurization rich liquor 5 is transferred to the heating-regenerator 6 and is heated to release gaseous sulfur dioxide and/or sulfur trioxide 7. The gaseous sulfur dioxide and/or sulfur trioxide 7 may be transformed into by-products of liquid sulfur dioxide and/or sulfur trioxide of high purity by a certain processing means. Meanwhile, sulfur foams and/or dusts 8 may be produced or accumulated, and are separated from the main part of desulfurization solution. The separated sulfur foams and/or dusts 8 can be further processed into sulfur by-products, and there are also some ash residues discharged. The desulfurization rich liquor 5 is regenerated by heating-regenerator 6 and is then converted into the desulfurization lean liquor 4. The desulfurization lean liquor 4 can be transferred directly to the desulfurization-absorption process for recycle use. Alternatively, it can be transferred to the vacuum-regenerator and/or gas stripping-regenerator, and/or ultrasonication-regenerator, and/or microwave-regenerator, and/or radiation-regenerator to be further regenerated.

Figure 3:
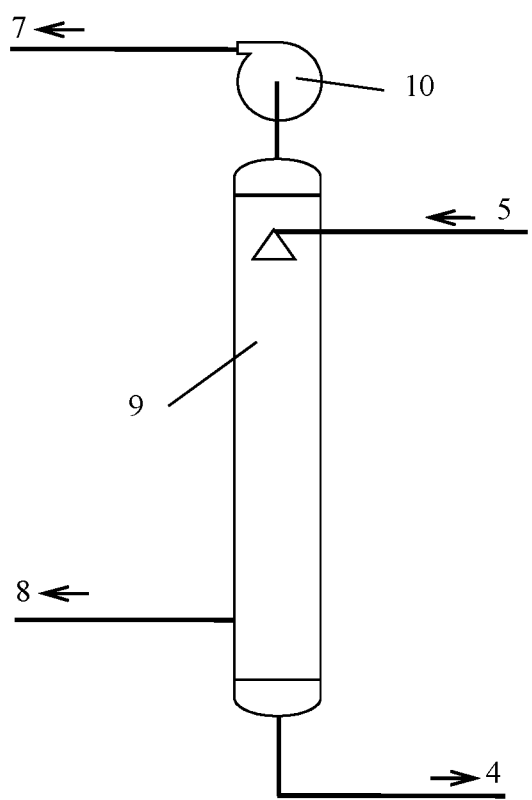
FIG. 3 is a schematic diagram of desulfurization solution regeneration by a vacuum method.

The embodiment of regeneration method by vacuum is shown in FIG. 3. The desulfurization rich liquor 5 is transferred to the vacuum-regenerator 9, vacuum is created with the aid of vacuum machine 10 to release gaseous sulfur dioxide and/or sulfur trioxide 7. The gaseous sulfur dioxide and/or sulfur trioxide 7 may be transformed into by-products of liquid sulfur dioxide and/or sulfur trioxide of high purity by a certain processing means. Meanwhile, sulfur foams and/or dusts 8 may be produced or accumulated, and are separated from the main part of desulfurization solution. The separated sulfur foams and/or dusts 8 can be further processed into sulfur by-products, and there are also some ash residues discharged. The desulfurization rich liquor 5 is regenerated by vacuum-regenerator 9 and is then converted into the desulfurization lean liquor 4. The desulfurization lean liquor 4 can be transferred directly to the desulfurization-absorption process for recycle use. Alternatively, it can be transferred to the heating-regenerator and/or gas stripping-regenerator, and/or ultrasonication-regenerator, and/or microwave-regenerator, and/or radiation-regenerator to be further regenerated.

Figure 4:
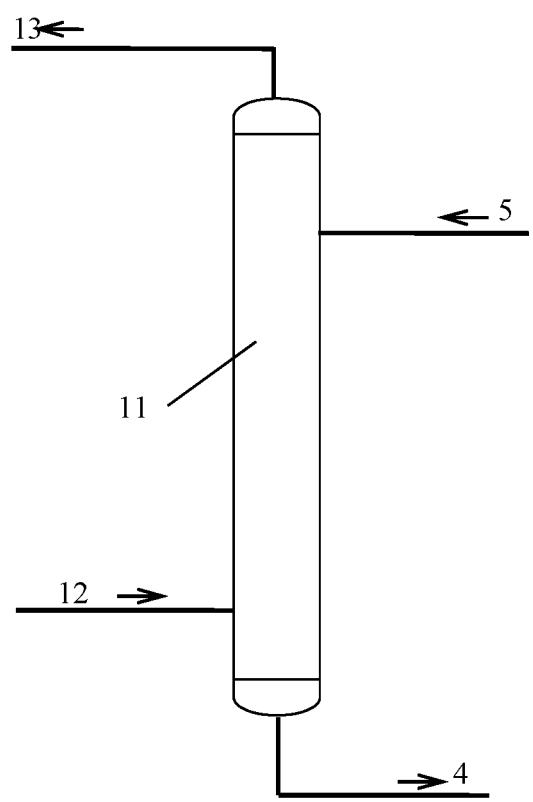
FIG. 4 is a schematic diagram of desulfurization solution regeneration by a gas stripping method.

The embodiment of regeneration method by gas stripping is shown in FIG. 4. The desulfurization rich liquor 5 is transferred to the gas stripping-regenerator 11, and contacted counter-currently with the inert gas 12 (including nitrogen, carbon dioxide, argon and water vapour, etc.) from the bottom of the gas stripping-regenerator 11. The sulfur dioxide and/or sulfur trioxide in the desulfurization rich liquor 5 are released into the inert gas and a mixed gas 13 of sulfur dioxide and/or sulfur trioxide with high concentration is formed and discharged from the top of the gas stripping-regenerator 11. The discharged sulfur dioxide and/or sulfur trioxide in the inert gas may be transformed into by-products of liquid sulfur dioxide and/or sulfur trioxide of high purity by a certain processing means. The desulfurization rich liquor 5 is regenerated by the gas striping-regenerator 11 and is then converted into the desulfurization lean liquor 4. The desulfurization lean liquor 4 can be transferred directly to the desulfurization-absorption process for recycle use. Alternatively, it can be transferred to the heating-regenerator and/or vacuum-regenerator, and/or ultrasonication-regenerator, and/or microwave-regenerator, and/or radiation-regenerator to be further regenerated.

Figure 5:
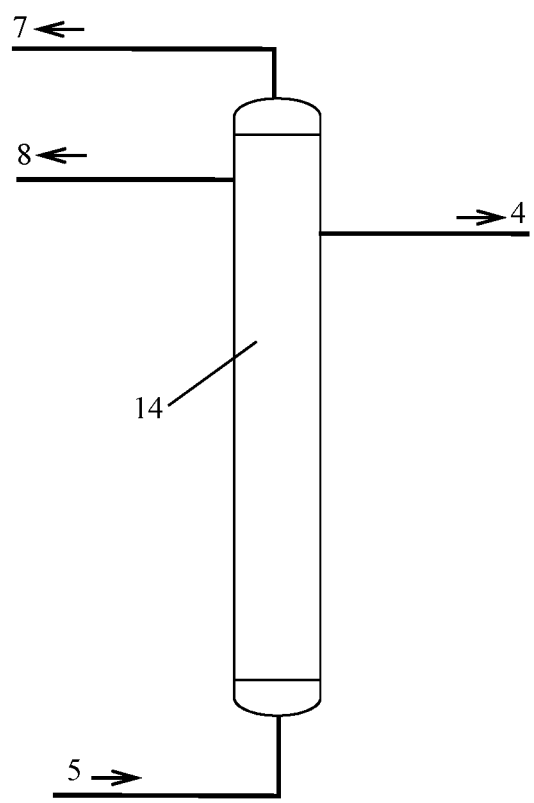
FIG. 5 is a schematic diagram of desulfurization solution regeneration by an ultrasonication method, and/or a microwave method, and/or a radiation method.

The embodiment of regeneration by ultrasonication method, and/or microwave method, and/or radiation method is shown in FIG. 5. The desulfurization rich liquor 5 is transferred to the ultrasonication-, and/or microwave-, and/or radiation-regenerator 14 and regenerated under the conditions of ultrasonication, and/or microwave, and/or radiation to release gaseous sulfur dioxide and/or sulfur trioxide 7. The gaseous sulfur dioxide and/or sulfur trioxide 7 may be transformed into by-products of liquid sulfur dioxide and/or sulfur trioxide of high purity by a certain processing means. Meanwhile, sulfur foams and/or dusts 8 may be produced or accumulated, and are separated from the main part of desulfurization solution. The separated sulfur foams and/or dusts 8 can be further processed into sulfur by-products, and there are also some ash residues discharged. The desulfurization rich liquor 5 is regenerated by ultrasonication-, and/or microwave-, and/or radiation-regenerator 14 and is then converted into the desulfurization lean liquor 4. The desulfurization lean liquor 4 can be transferred directly to the desulfurization-absorption process for recycle use. Alternatively, it can be transferred to the heating-regenerator, and/or vacuum-regenerator, and/or gas stripping-regenerator to be further regenerated.

Figure 6:
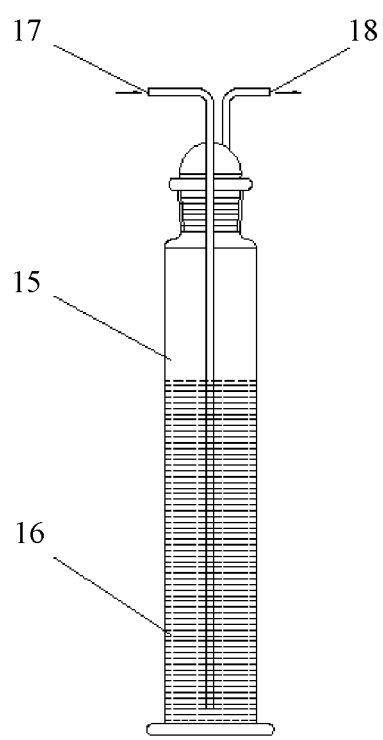
FIG. 6 is a schematic diagram of structure of a small-sized desulfurization-absorption device.
Figure 7:
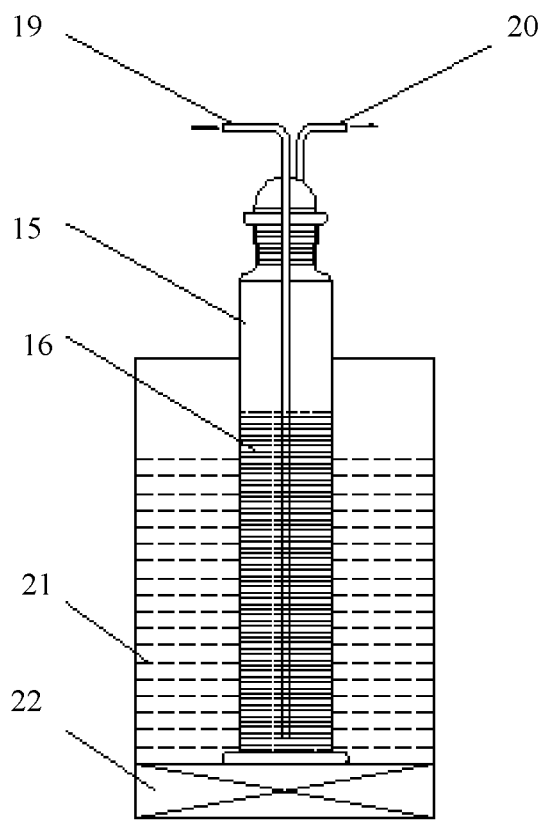
FIG. 7 is a schematic diagram of structure of a small-sized heating and gas stripping-regeneration device.

According to the specific concepts of the above embodiments, a small-sized absorption device shown in FIG. 6 and a small-sized heating and gas stripping-regeneration device shown in FIG. 7 were designed and mounted respectively.

In the small-sized absorption device as shown in FIG. 6, 15 represented an absorption bottle (or a regeneration bottle when regenerating), 16 represented the ethylene glycol composite solution, 17 represented the gas containing sulfur dioxide, and 18 represented a vented gas.

In the small-sized heating and gas stripping-regeneration device as shown in FIG. 7, 15 represented a regeneration bottle (or an absorption bottle when absorbing), 16 represented the ethylene glycol composite solution with absorbed sulfur dioxide, 19 represented a gas for gas stripping ($N_2$ in this test), 20 represented the stripping gas containing sulfur dioxide, 21 represented a silicone oil for oil bath, and 22 represented a thermostatic heating pot.

In the experiment, as shown in FIG. 6, about 100 ml fresh ethylene glycol composite solution 16 was charged into the absorption bottle 15. A certain amount (L, liter) of gas 17 containing sulfur dioxide was blown into the absorption bottle 15 containing the ethylene glycol composite solution 16 at room temperature and passed through the ethylene glycol composite solution 16. The sulfur dioxide in the gas was absorbed by the ethylene glycol composite solution 16. The gas with sulfur dioxide removed was referred to as the vented gas 18. The vented gas 18 was discharged outside. At the same time, the content of sulfur dioxide ($C^*_{SO2}$, g/L) in the ethylene glycol composite solution 16 was measured using iodimetry. Then, the absorption bottle containing the ethylene glycol composite solution with absorbed sulfur dioxide was placed into the thermostatic heating pot in the oil bath. At this time, the absorption bottle 15 served as the regeneration bottle 15. The content of sulfur dioxide in the ethylene glycol composite solution 16 had already been measured and it could be used as the ethylene glycol composite solution 16 with absorbed sulfur dioxide to be regenerated. As shown in FIG. 7, the temperature in the thermostatic heating pot 22 was adjusted to a desired constant temperature to heat the silicone oil 21 for oil bath. When the temperature of the system was kept at the desired temperature (t, ° C.), the gas 19 for gas stripping ($N_2$ in this test) was blown into the regeneration bottle 15. The gas 19 for gas stripping ($N_2$ in this test) was sufficiently contacted with the ethylene glycol composite solution 16 containing sulfur dioxide. At this time, the sulfur dioxide contained in the ethylene glycol composite solution 16 was transferred into the gas 19 for gas stripping ($N_2$ in this test). At this time, the gas 19 for gas stripping ($N_2$ in this test) containing sulfur dioxide was transformed into the stripping gas 20 containing sulfur dioxide, vented and discharged outside. After being regenerated for a period of time (T, min) by heating and gas stripping, the regeneration bottle 15 was taken out and cooled to normal temperature with water. The content of sulfur dioxide ($C_{SO2}$, g/L) in the regenerated ethylene glycol composite solution 16 was measured using iodimetry. The absorption and regeneration of the regenerated ethylene glycol composite solution 16 were repeated many times in accordance with the above steps. The changes appeared in the ethylene glycol composite solution were observed. According to the above test, the experiments for the absorption and desorption of $SO_2$ contained in the gas were repeated many times with a system of 84% EG (ethylene glycol)+6% citric acid monopotassium salt+10% citric acid, a system of 93% EG (ethylene glycol)+7% citric acid monopotassium salt, a system of 60% PEG (polyethylene glycol 400)+3.3% citric acid+4% citric acid monopotassium salt+32.7% $H_2O$, a system of 60% PEG+3% citric acid+5% citric acid monopotassium salt+32% $H_2O$, a system of 60% PEG+8% citric acid+5% citric acid monopotassium salt+27% $H_2O$, a system of 76% EG (ethylene glycol)+22% acetic acid+2% acetic acid potassium salt, and a system of 60% EG+30% water+7.8% oxalic acid monopotassium salt+2.2% oxalic acid. The experiment data were listed in Tables 1 to 7 respectively.

TABLE 1

The absorption and desorption of $SO_2$ with 84% EG (ethylene glycol) + 6% citric acid monopotassium salt + 10% citric acid(100 mL)

| Number of times for absorption and regeneration | Volume of gas to be absorbed (the content of $SO_2$ in the gas is about 1%) L (litre) | Content of sulfur dioxide in the polyol composite solution after absorption $C^*_{SO2}$ (g/L) | Content of sulfur dioxide in the polyol composite solution after regeneration $C_{SO2}$ (g/L) | Regeneration temperature t (° C.) | Regeneration time T (min) | Appearance of the polyol composite solution after regeneration |
|---|---|---|---|---|---|---|
| $1^{st}$ | 30 | 3.6288 | 0.2097 | 150 | 45 | no changes in color |
| $2^{nd}$ | 40 | 4.4029 | 0.2097 | 150 | 45 | |
| $3^{rd}$ | 50 | 4.6610 | 0.4516 | 150 | 45 | |
| $3^{rd}$ | 50 | 5.6448 | 0.2419 | 150 | 45 | |

TABLE 1-continued

The absorption and desorption of $SO_2$ with 84% EG (ethylene glycol) + 6% citric acid monopotassium salt + 10% citric acid(100 mL)

| Number of times for absorption and regeneration | Volume of gas to be absorbed (the content of $SO_2$ in the gas is about 1%) L (litre) | Content of sulfur dioxide in the polyol composite solution after absorption $C^*_{SO2}$ (g/L) | Content of sulfur dioxide in the polyol composite solution after regeneration $C_{SO2}$ (g/L) | Regeneration temperature t (° C.) | Regeneration time T (min) | Appearance of the polyol composite solution after regeneration |
|---|---|---|---|---|---|---|
| $5^{th}$ | 50 | 5.5158 | 0.3226 | 150 | 45 | |
| $6^{th}$ | 50 | 5.6125 | 0.2903 | 150 | 45 | |

TABLE 2

The absorption and desorption of $SO_2$ with 93% EG (ethylene glycol) + 7% citric acid monopotassium salt(100 mL)

| Number of times for absorption and regeneration | Volume of gas to be absorbed (the content of $SO_2$ in the gas is about 1%) L (litre) | Content of sulfur dioxide in the polyol composite solution after absorption $C^*_{SO2}$ (g/L) | Content of sulfur dioxide in the polyol composite solution after regeneration $C_{SO2}$ (g/L) | Regeneration temperature t (° C.) | Regeneration time T (min) | Appearance of the polyol composite solution after regeneration |
|---|---|---|---|---|---|---|
| $1^{st}$ | 10.5 | 1.2096 | 0.5645 | 135 | 30 | no changes in color |
| $2^{nd}$ | 20 | 2.1612 | 0.9838 | 135 | 30 | |
| $3^{rd}$ | 10 | 1.7741 | 0.6451 | 135 | 30 | |
| $3^{rd}$ | 10 | 1.6934 | 0.6129 | 140 | 45 | |
| $5^{th}$ | 27 | 3.7901 | 1.9837 | 140 | 30 | |
| $6^{th}$ | 13 | 3.3385 | 1.1773 | 140 | 30 | |
| $7^{th}$ | 10 | 2.1492 | 0.4838 | 140 | 90 | |
| $8^{th}$ | 38 | 4.5481 | 0.8064 | 145 | 60 | |
| $9^{th}$ | 30 | 4.1610 | 0.7741 | 145 | 60 | |
| $10^{th}$ | 30 | 4.2739 | 0.8548 | 145 | 60 | |
| $11^{th}$ | 30 | 4.5158 | 0.4838 | 150 | 90 | |

TABLE 3

The absorption and desorption of $SO_2$ with 60% PEG + 3.3% citric acid + 4% citric acid monopotassium salt + 32.7% $H_2O$(150 mL)

| Number of times for absorption and regeneration | Volume of gas to be absorbed (the content of $SO_2$ in the gas is about 1%) L (litre) | Content of sulfur dioxide in the polyol composite solution after absorption $C^*_{SO2}$ (g/L) | Content of sulfur dioxide in the polyol composite solution after regeneration $C_{SO2}$ (g/L) | Regeneration temperature t (° C.) | Regeneration time T (min) | Appearance of the polyol composite solution after regeneration |
|---|---|---|---|---|---|---|
| $1^{st}$ | 20 | 2.2579 | 0.2592 | 150 | 60 | no changes in color |
| $2^{nd}$ | 20 | 2.5915 | 0.6479 | 150 | 15 | |
| $3^{rd}$ | 15 | 2.9155 | 0.1296 | 150 | 30 | |
| $3^{rd}$ | 15 | 2.2676 | 0.1296 | 150 | 30 | |
| $5^{th}$ | 15 | 1.9436 | 0.1296 | 150 | 30 | |
| $6^{th}$ | 15 | 2.1056 | 0.1296 | 150 | 30 | |
| $7^{th}$ | 15 | 1.9436 | 0.1296 | 150 | 30 | |
| $8^{th}$ | 15 | 2.0408 | 0.1296 | 150 | 30 | |
| $9^{th}$ | 15 | 2.0732 | 0.1296 | 150 | 30 | |
| $10^{th}$ | 15 | 2.0408 | 0.1296 | 150 | 30 | |
| $11^{th}$ | 15 | 1.9436 | 0.1296 | 150 | 30 | |
| $12^{th}$ | 15 | 2.1056 | 0.1296 | 150 | 30 | |
| $13^{th}$ | 15 | 1.9436 | 0.1296 | 150 | 30 | |
| $14^{th}$ | 15 | 2.0084 | 0.1296 | 150 | 30 | |
| $15^{th}$ | 15 | 1.9436 | 0.1296 | 150 | 30 | |
| $16^{th}$ | 10 | 1.4577 | 0.1296 | 120 | 30 | |

TABLE 4

The absorption and desorption of $SO_2$ with 60% PEG + 3% citric acid + 5% citric acid monopotassium salt + 32% $H_2O$ (150 mL)

| Number of times for absorption and regeneration | Volume of gas to be absorbed (the content of $SO_2$ in the gas is about 1%) L (litre) | Content of sulfur dioxide in the polyol composite solution after absorption $C^*_{SO2}$ (g/L) | Content of sulfur dioxide in the polyol composite solution after regeneration $C_{SO2}$ (g/L) | Regeneration temperature t (° C.) | Regeneration time T (min) | Appearance of the polyol composite solution after regeneration |
|---|---|---|---|---|---|---|
| $1^{st}$ | 16 | 2.2028 | 1.2310 | 120 | 30 | no changes in color |
| $2^{nd}$ | 15 | 2.9802 | 0.4211 | 130 | 30 | |
| $3^{rd}$ | 15 | 2.2676 | 0.5507 | 130 | 30 | |
| $3^{rd}$ | 15 | 2.5915 | 0.3239 | 130 | 30 | |
| $5^{th}$ | 30 | 4.0816 | 0.1296 | 130 | 30 | |
| $6^{th}$ | 15 | 2.4295 | 0.1296 | 130 | 30 | |
| $7^{th}$ | 15 | 2.4619 | 0.1296 | 130 | 30 | |
| $8^{th}$ | 15 | 2.4295 | 0.1296 | 130 | 30 | |
| $9^{th}$ | 19 | 3.1422 | 0.3239 | 130 | 30 | |
| $10^{th}$ | 15 | 2.5915 | 0.2592 | 130 | 30 | |
| $11^{th}$ | 15 | 2.7535 | 0.1296 | 130 | 30 | |

TABLE 5

The absorption and desorption of $SO_2$ with 60% PEG + 8% citric acid + 5% citric acid monopotassium salt + 27% $H_2O$ (150 mL)

| Number of times for absorption and regeneration | Volume of gas to be absorbed (the content of $SO_2$ in the gas is about 1%) L (litre) | Content of sulfur dioxide in the polyol composite solution after absorption $C^*_{SO2}$ (g/L) | Content of sulfur dioxide in the polyol composite solution after regeneration $C_{SO2}$ (g/L) | Regeneration temperature t (° C.) | Regeneration time T (min) | Appearance of the polyol composite solution after regeneration |
|---|---|---|---|---|---|---|
| $1^{st}$ | 15 | 2.7859 | 0.1296 | / | 0 | no changes in color |
| $2^{nd}$ | 15 | 2.4619 | 0.1296 | 130 | 30 | |
| $3^{rd}$ | 15 | 2.5267 | 0.1296 | 130 | 30 | |
| $3^{rd}$ | 15 | 2.4295 | 0.1296 | 130 | 30 | |
| $5^{th}$ | 15 | 2.2676 | 0.1296 | 130 | 30 | |
| $6^{th}$ | 15 | 2.1704 | 0.2592 | 130 | 30 | |
| $7^{th}$ | 15 | 2.2676 | 0.2592 | 130 | 30 | |
| $8^{th}$ | 15 | 2.3324 | 0.2592 | 130 | 30 | |
| $9^{th}$ | 15 | 2.2676 | 0.2592 | 130 | 30 | |
| $10^{th}$ | 15 | 2.2352 | 0.1296 | 130 | 30 | |

TABLE 6

The absorption and desorption of $SO_2$ with 76% EG (ethylene glycol) + 22% acetic acid + 2% acetic acid potassium salt (130 mL)

| Number of times for absorption and regeneration | Volume of gas to be absorbed (the content of $SO_2$ in the gas is about 1%) L (litre) | Content of sulfur dioxide in the polyol composite solution after absorption $C^*_{SO2}$ (g/L) | Content of sulfur dioxide in the polyol composite solution after regeneration $C_{SO2}$ (g/L) | Regeneration temperature t (° C.) | Regeneration time T (min) | Appearance of the polyol composite solution after regeneration |
|---|---|---|---|---|---|---|
| $1^{st}$ | 15 | 2.0408 | 0.1296 | 130 | 30 | no changes in color |
| $2^{nd}$ | 15 | 2.4295 | 0.1296 | 130 | 30 | |
| $3^{rd}$ | 15 | 2.2028 | 0.1296 | 130 | 30 | |
| $3^{rd}$ | 15 | 2.3000 | 0.1296 | 130 | 30 | |
| $5^{th}$ | 15 | 2.4295 | 0.1296 | 130 | 30 | |
| $6^{th}$ | 15 | 2.5915 | 0.1296 | 130 | 30 | |
| $7^{th}$ | 15 | 2.5267 | 0.1296 | 130 | 30 | |
| $8^{th}$ | 15 | 2.7535 | 0.1296 | 130 | 30 | |
| $9^{th}$ | 15 | 2.9155 | 0.2592 | 130 | 30 | |
| $10^{th}$ | 15 | 2.8507 | 0.2592 | 130 | 30 | |

TABLE 7

The absorption and desorption of $SO_2$ with 60% EG + 30% water + 7.8% oxalic acid monopotassium salt + 2.2% oxalic acid(150 mL)

| Number of times for absorption and regeneration | Volume of gas to be absorbed (the content of $SO_2$ in the gas is about 1%) L (litre) | Content of sulfur dioxide in the polyol composite solution after absorption $C^*_{SO2}$ (g/L) | Content of sulfur dioxide in the polyol composite solution after regeneration $C_{SO2}$ (g/L) | Regeneration temperature t (° C.) | Regeneration time T (min) | Appearance of the polyol composite solution after regeneration |
|---|---|---|---|---|---|---|
| $1^{st}$ | 15 | 2.4295 | 0.1296 | 130 | 30 | The solution became milky white and slightly turbid during absorption, and the solution became colorless during regeneration |
| $2^{nd}$ | 15 | 1.9436 | 0.1296 | 130 | 30 | |
| $3^{rd}$ | 15 | 2.1056 | 0.1296 | 130 | 30 | |
| $3^{rd}$ | 15 | 2.1704 | 0.1296 | 130 | 30 | |
| $5^{th}$ | 15 | 2.1056 | 0.1296 | 130 | 30 | |
| $6^{th}$ | 15 | 1.9436 | 0.1296 | 130 | 30 | |
| $7^{th}$ | 15 | 1.9436 | 0.1296 | 130 | 30 | |
| $8^{th}$ | 15 | 1.8788 | 0.1296 | 130 | 30 | |
| $9^{th}$ | 15 | 1.9436 | 0.1296 | 130 | 30 | |
| $10^{th}$ | 15 | 1.8788 | 0.1296 | 130 | 30 | |

From the above experimental data in Tables 1 to 7, it can be seen that these ethylene glycol composite solutions have good effects on absorption for $SO_2$ and regeneration. This indicates that these systems are good desulfurization solvents for flue gases.

What is claimed is:

1. A method for removing $SO_x$ from a gas, comprising:
mixing ethylene glycol, polyethylene glycol, or both ethylene glycol and polyethylene glycol with an organic acid, an organic acid salt, or both the organic acid and the organic acid salt to form a composite solution, wherein the organic acid and the organic acid salt are compounds that contain no nitrogen atoms;
bringing the composite solution into contact with the gas containing $SO_x$ to absorb the $SO_x$ in the gas, wherein $SO_x$ is $SO_2$, $SO_3$, or a mixture thereof, and
wherein the composite solution contains one or more additives selected from the group consisting of organic amines, amides, sulfones, sulfoxides, and metallorganic compounds.

2. The method for removing $SO_x$ from a gas according to claim 1, wherein the organic acid is an organic monoacid, an organic polyacid, or a mixture thereof; the organic acid salt is an organic monoacid salt, an organic polyacid salt, or a mixture thereof.

3. The method for removing $SO_x$ from a gas according to claim 2, wherein the organic acid is selected from the group consisting of formic acid, acetic acid, butyric acid, ethanedioic acid, propanedioic acid, butanedioic acid, tannin acid, polygallic acid, citric acid, and mixtures thereof, and
the organic acid salt is a carboxylic acid salt formed by combining the organic acid with one or more selected from the group consisting of sodium ions, potassium ions, magnesium ions, calcium ions, and transition metal ions.

4. The method for removing $SO_x$ from a gas according to claim 1, wherein the composite solution contain less than 50% in mass of water, and less than 30% in mass of the organic acid, the organic salt, or both.

5. The method for removing $SO_x$ from a gas according to claim 1, wherein a mass content of the additives in the composite solution is less than 10%.

6. The method for removing $SO_x$ from a gas according to claim 1, wherein the composite solution absorbs the $SO_x$ in the gas under atmospheric pressure or an elevated pressure at a temperature of −20 to 80° C.

7. The method for removing $SO_x$ from a gas according to claim 1, further comprising regenerating the composite solution loaded with absorbed $SO_x$ by heating, vacuuming, gas stripping, ultrasonic treatment, microwave treatment, or radiation treatment at a temperature of 0 to 300° C. to release $SO_x$ from the composite solution; and recycling the regenerated composite solution.

8. The method for removing $SO_x$ from a gas according to claim 1, wherein the gas is a flue gas, a waste gas, an industrial raw material gas containing $SO_x$, or mixtures thereof.

9. A method for removing $SO_x$ from a gas, comprising:
mixing ethylene glycol, polyethylene glycol, or both ethylene glycol and polyethylene glycol with an organic acid, an organic acid salt, or both the organic acid and the organic acid salt to form a composite solution, wherein the organic acid and the organic acid salt are compounds that contain no nitrogen atoms;
bringing the composite solution into contact with the gas containing $SO_x$ to absorb the $SO_x$ in the gas, wherein $SO_x$ is $SO_2$, $SO_3$, or a mixture thereof, the organic acid is selected from the group consisting of formic acid, acetic acid, butyric acid, ethanedioic acid, propanedioic acid, butanedioic acid, tannin acid, polygallic acid, citric acid, and mixtures thereof, and the organic acid salt is a carboxylic acid salt formed by combining the organic acid with one or more selected from the group consisting of sodium ions, potassium ions, magnesium ions, calcium ions, and transition metal ions.

* * * * *